(12) United States Patent
Godshaw et al.

(10) Patent No.: US 6,595,687 B2
(45) Date of Patent: Jul. 22, 2003

(54) EXPANDABLE STORAGE AND CARRYING CASE

(75) Inventors: Donald E. Godshaw, Evanston, IL (US); Andrezj Redzisz, Skokie, IL (US)

(73) Assignee: Travel Caddy, Inc., Des Plaines, IL (US)

( * ) Notice: Subject to any disclaimer, the term of this patent is extended or adjusted under 35 U.S.C. 154(b) by 0 days.

(21) Appl. No.: 09/951,254

(22) Filed: Sep. 13, 2001

(65) Prior Publication Data

US 2002/0181806 A1 Dec. 5, 2002

Related U.S. Application Data

(60) Provisional application No. 60/240,487, filed on Oct. 13, 2000.

(51) Int. Cl.⁷ .......................... B65D 30/06; B65D 30/16
(52) U.S. Cl. .......................... 383/6; 383/99; 383/110; 383/117; 206/315.11
(58) Field of Search .................. 383/99, 110, 6, 383/117, 43, 121.1; 206/315.11; 150/118

(56) References Cited

U.S. PATENT DOCUMENTS

| 875,224 | A | * | 12/1907 | Underwood | 229/117.23 |
|---|---|---|---|---|---|
| 1,341,404 | A | * | 5/1920 | Wisniewska | 383/122 |
| 1,550,470 | A | * | 8/1925 | Tilden | 383/122 |
| 1,649,976 | A | * | 11/1927 | Pomeranz | 383/10 |
| 1,658,997 | A | * | 2/1928 | Mulford et al. | 190/109 |
| 2,337,860 | A | * | 12/1943 | Zeitenberg | 190/106 |
| 2,431,030 | A | * | 11/1947 | Edwards | 383/6 |
| 2,795,258 | A | * | 6/1957 | Berry et al. | 190/106 |
| 2,960,136 | A | * | 11/1960 | Ziff | 190/106 |
| 3,031,121 | A | * | 4/1962 | Chase | 220/902 |
| 4,836,690 | A | * | 6/1989 | Cheng | 383/42 |
| 4,988,216 | A | * | 1/1991 | Lyman | 383/110 |
| 5,472,279 | A | * | 12/1995 | Lin | 383/110 |
| 5,800,061 | A | * | 9/1998 | Volles | 150/103 |
| 5,820,268 | A | * | 10/1998 | Becker et al. | 220/592.2 |
| 6,119,858 | A | * | 9/2000 | Davidson | 190/109 |
| 6,328,146 | B1 | * | 12/2001 | Siwak | 150/106 |

* cited by examiner

Primary Examiner—Stephen P. Garbe
(74) Attorney, Agent, or Firm—Banner & Witcoff, Ltd.

(57) ABSTRACT

A storage bag is disclosed with two embodiments wherein the bag is in the form of a rectangular parallelpiped having overlapping top flaps to form an enclosure. In one embodiment the front and back panels are biased toward one another by elastic incorporated in mesh side panels. In a second embodiment the top flaps are joined by webs of insulating material which function to facilitate the insulating capacity of the storage bag.

8 Claims, 4 Drawing Sheets

EXPANDABLE STORAGE AND CARRYING CASE

CROSS REFERENCE TO RELATED APPLICATION

This is a utility application based upon previously filed provisional application Ser. No. 60/240,487 filed Oct. 13, 2000 for a Tackle Box Bag which is incorporated herewith by reference and for which priority is claimed.

BACKGROUND OF THE INVENTION

In a principal aspect the present invention relates to a storage bag that is capable of manufacture in various versions including a version which may be used as a tackle box bag as well as a version that may be used as an insulated container or bag.

Outdoorsmen, hikers, campers, fisherman and the like require a variety of paraphernalia and materials that will enable them to enjoy their particular hobby, craft, trade, or the like. Fishermen, for example, require a variety of tackle items. Typically fishermen prefer to store such materials in protective plastic containers or boxes.

Additionally outdoorsmen often need insulated bags for storage of food, provisions, and the like. Fishermen may need such a bag to carry their catch or store their catch in combination with ice, dry ice, or cooling packs.

Preferably such storage bags have a generally rectangular parallelepiped shape so that they will easily accommodate other types of storage containers and so that they may be easily transported as well as stored. Further, it is desirable to have such storage bags made from materials that may be easily compressed or folded so that when not in use, they will take up a minimum of space and additionally will take up a minimum of space when being offered for sale, shipment, or otherwise not in use. Thus, there has developed a need for an improved type of storage bag which may be adapted for multiple uses depending upon features incorporated in or with the bag.

SUMMARY OF THE INVENTION

Briefly the present invention comprises a rectangular parallelpiped, storage bag which in a first embodiment includes a back panel, a bottom panel, and a front panel joined by side panels made of mesh and incorporating elastic connecting straps or members. The elastic straps help retain the contents of the bag to be maintained or bound within the bag. An optional, central mesh panel may be provided in the bag so that plastic tackle boxes or containers may be easily positioned in and carried in the bag. One important feature of the bag is inclusion of top flaps that fold one over the other to protect the contents of the bag. Handles are provided attached at the juncture of the top panels with the front and back panels, respectively. In this manner, the contents of the bag may be more easily retained therein.

A second embodiment of the invention includes various panels forming the parallelepiped bag made from insulating material. All of the bag panels are flexible. With the insulating panel embodiment, the back side and front side top flaps are connected by a web that folds over the contents of the bag to prevent access into the bag from the opposite ends of the bag and further providing improved insulating characteristics for the bag when the top flaps are folded one over the other.

Thus it is an object of the invention to provide an improved rectangular parallelepiped, storage bag which may be adapted for a multiple number of purposes and which provides maximum storage capacity.

A further object of the invention is to provide a storage bag that may be adapted to easily carry rigid plastic tackle boxes, the storage bag thus being generally modular in size so as to receive and retain such storage boxes.

A further object of the invention is to provide a storage bag that in one embodiment includes elastic members incorporated in end panels to facilitate retention of items within the bag.

Another object of the invention is to provide a storage bag wherein the end panels include web extensions connecting overlapping top flaps to facilitate retention of the flaps of the bag when the contents are in the closed position as well as to provide additional insulating benefit.

Yet another object of the invention is to provide a design for a rectangular parallelepiped, storage bag that is easily carried by means of handles attached to front and back panels of the bag, which is flexible, which will carry multiple items and which is economical, generally easy to manufacture, attractive, and lightweight.

These and other objects, advantages, and features of the invention will be set forth in a detailed description that follows.

BRIEF DESCRIPTION OF THE DRAWING

In the detailed description that follows reference will be made to the drawing comprised of the following figures.

DESCRIPTION OF THE PREFERRED EMBODIMENT

Figure 1:
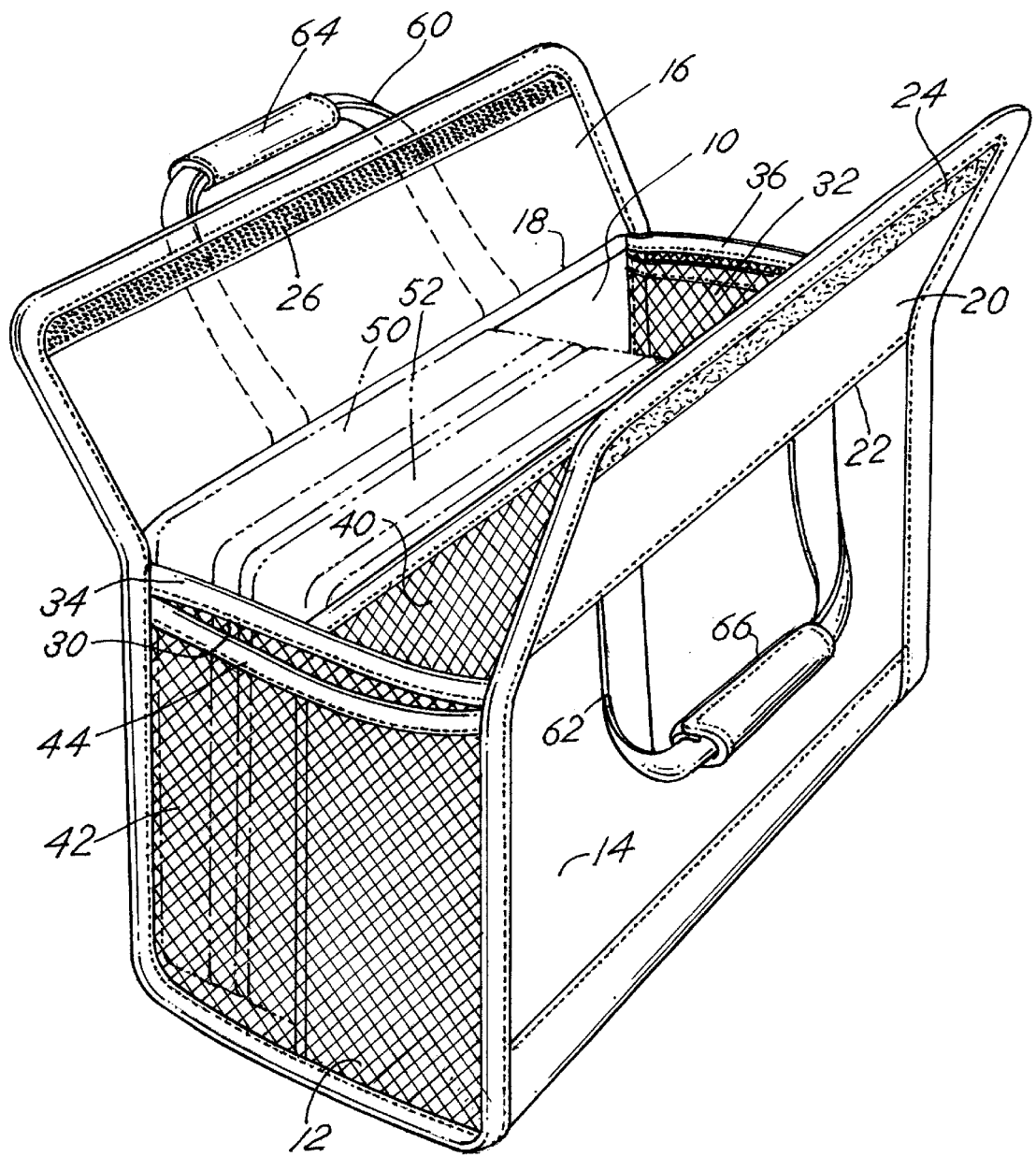
FIG. 1 is an isometric view of a first embodiment of the invention wherein the storage bag is uniquely useful as a tackle box bag.

The embodiment of FIG. 1 of the bag of the invention is made from a vinyl, canvas, or other flexible type fabric material. The bag includes a back side panel 10, a bottom side panel 12 and a front side panel 14. The sides or panels 10, 12 and 14 are joined together or seamed together and arrayed as a continuous U-shaped form defining an enclosure. The back panel 10 further includes a top foldover flap or panel 16 which folds along a folding edge 18. Similarly, the front panel 14 includes a top foldover flap or panel 20 which folds along an edge 22 of front panel 14. The flaps 16 and 20 are dimensioned so as to fold over one another. The top flap 20 includes an outside fastening strip 24, such as a Velcro fastening strip, which cooperates with and engages a fastening strip 26 on the inside of the back flap 16. In this manner, the flaps 16 and 20 may be folded over one another with the back side flap 16 folded over the front side flap 20 to enclose and retain items within the bag.

The back side and the front side 14 are spaced from one another and are generally parallel to one another. The bag, thus, is in the form of a rectangular parallelepiped. Lateral sides or panels 30, 32 of the bag comprise a first mesh panel 30 connected to the side edge of bottom panel 12 and between the side edges of the back side 10 and front side 14, and a second mesh panel 32 at the opposite end edges of panels 10, 12, 14 and connecting the back side panel 10 and front side panel 14. An elastic band 34 connects from the junction of the back side panel 10, flap 16 and mesh panel 30 to the junction of the front side panel 14, flap 20 and mesh panel 30. The elastic band 34 tends to draw the back and front panels 10 and 14 together at their upper end or edge so as to retain the contents of the bag enclosure. In a similar fashion, the second lateral mesh panel 32 includes an elastic band 36 connected between the back panel 10 and front panel 14. The band 36 has a function substantially the same as the function of the band 34.

Midway between and parallel to the panels 10 and 14 is an intermediate flexible mesh panel 40 connected between the mesh panels 30 and 32. The mesh panel 40 effects compartmentalization of the interior of the formed bag. The mesh side panel 30 may have a secondary panel 42 overlying the panel side 30 and spaced slightly therefrom for storage of additional materials. The side mesh panel 42 may further include an elastic band 44 along its upper margin. The combination of the bands 34 and 44 effect an elastic force which tends to maintain the contents of the bag in position within the bag by holding back panel 10 and front panel 14. The bag is designed in a modular fashion so as to retain tackle boxes, such as rigid, transparent plastic tackle boxes 50 and 52 which are shown in partial cutaway view in one of the pockets formed by the back panel 10 and intermediate mesh panel 40 in combination with the end or lateral side panels 30 and 32.

Flexible handles 60 and 62 are affixed to the top edgese of the back panel 10 and front panel 14, respectively, at the juncture of those panels 10, 14 with the flaps 16 and 20, respectively. Thus, when the flaps 16 and 20 are in the closed position so as to retain tackle boxes 50 and 52 and any additional tackle boxes retained within the enclosure, the handles 60 and 62, and more particularly, grips 64 and 66 of the handles 60 and 62 may be manually held so as to permit carrying of the bag.

Among the unique features of the bag is the modularization of the compartments so that they will hold state of the art tackle boxes 50 and 52. The tackle boxes 50 and 52 are typically plastic, molded, rigid tackle boxes. The panels 10, 12 and 14 act to encapsulate the boxes for carrying and protect the boxes and their contents. Importantly, the elastic bands 34 and 36 provide a retaining force to hold the tackle boxes 50 and 52 and other materials within the bag in place.

Figure 2:
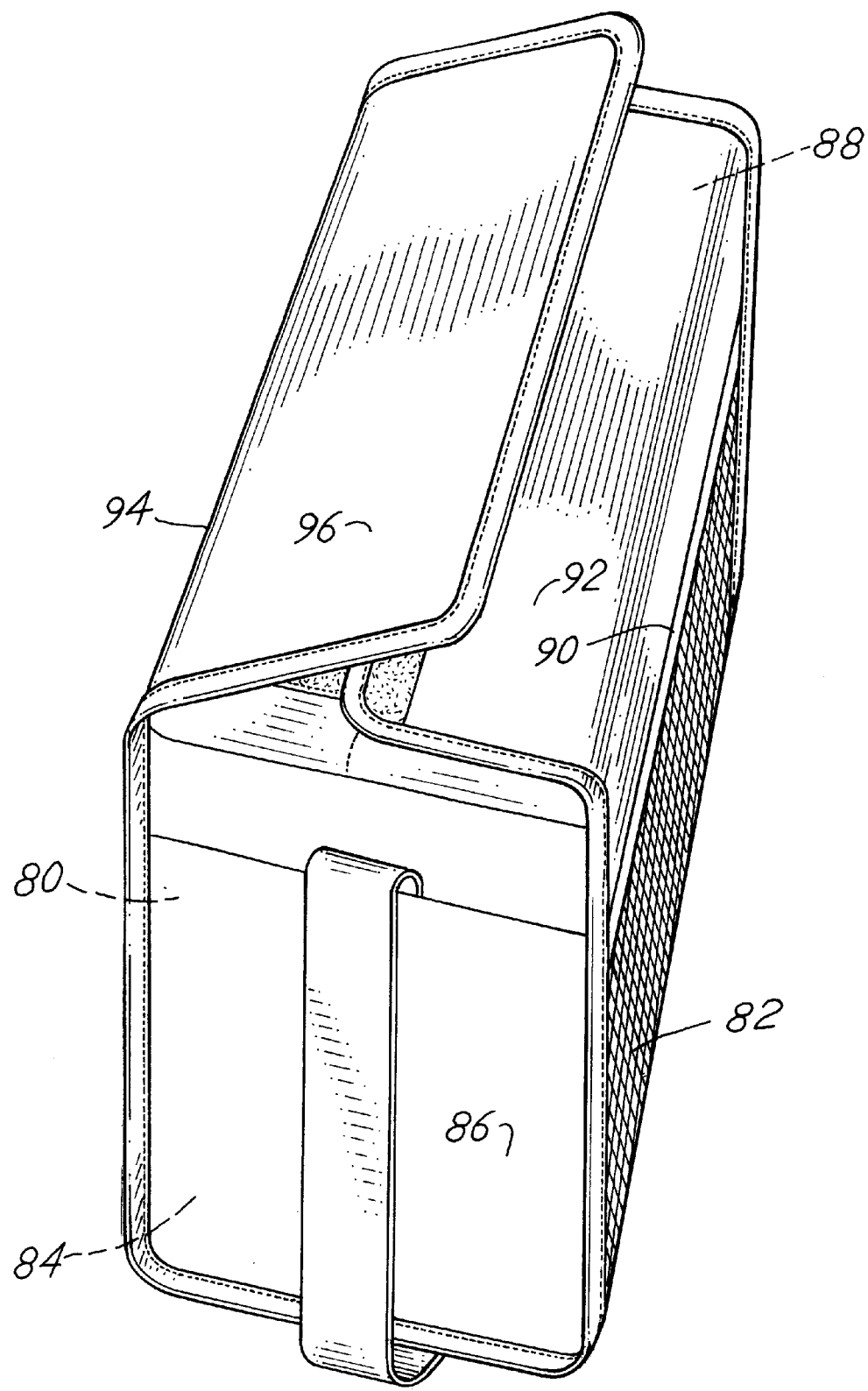
FIG. 2 is an isometric view of a second embodiment of the invention wherein the top flaps of the bag are overlapped to enclose the interior of the bag and wherein the bag panels are made from flexible, insulating material to provide an insulated storage bag.
Figure 3:
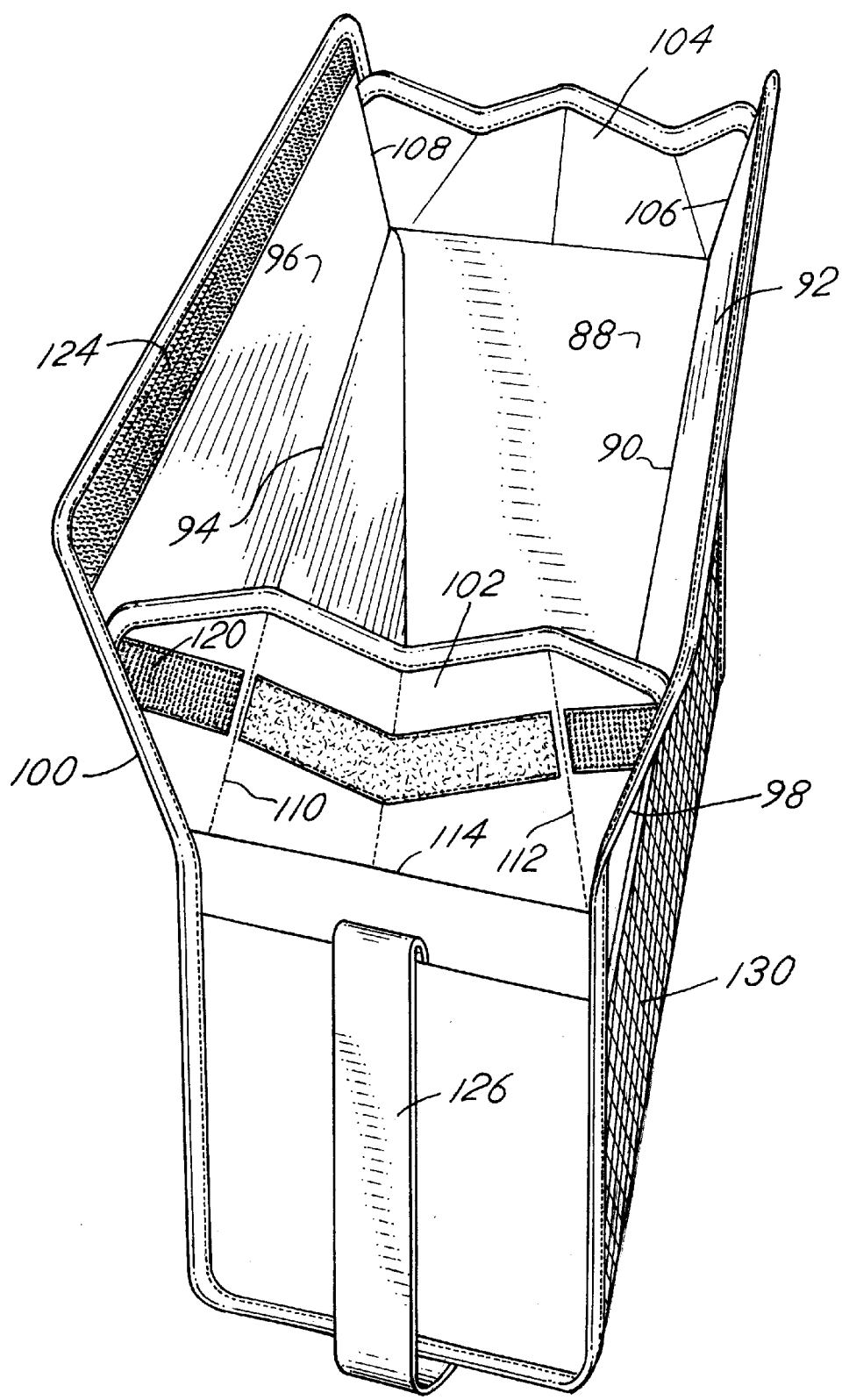
FIG. 3 is an isometric view of the bag of FIG. 2 wherein the top flaps of the bag are in the fully opened position revealing the web connection between the top flaps and the side panels of the bag.
Figure 4:
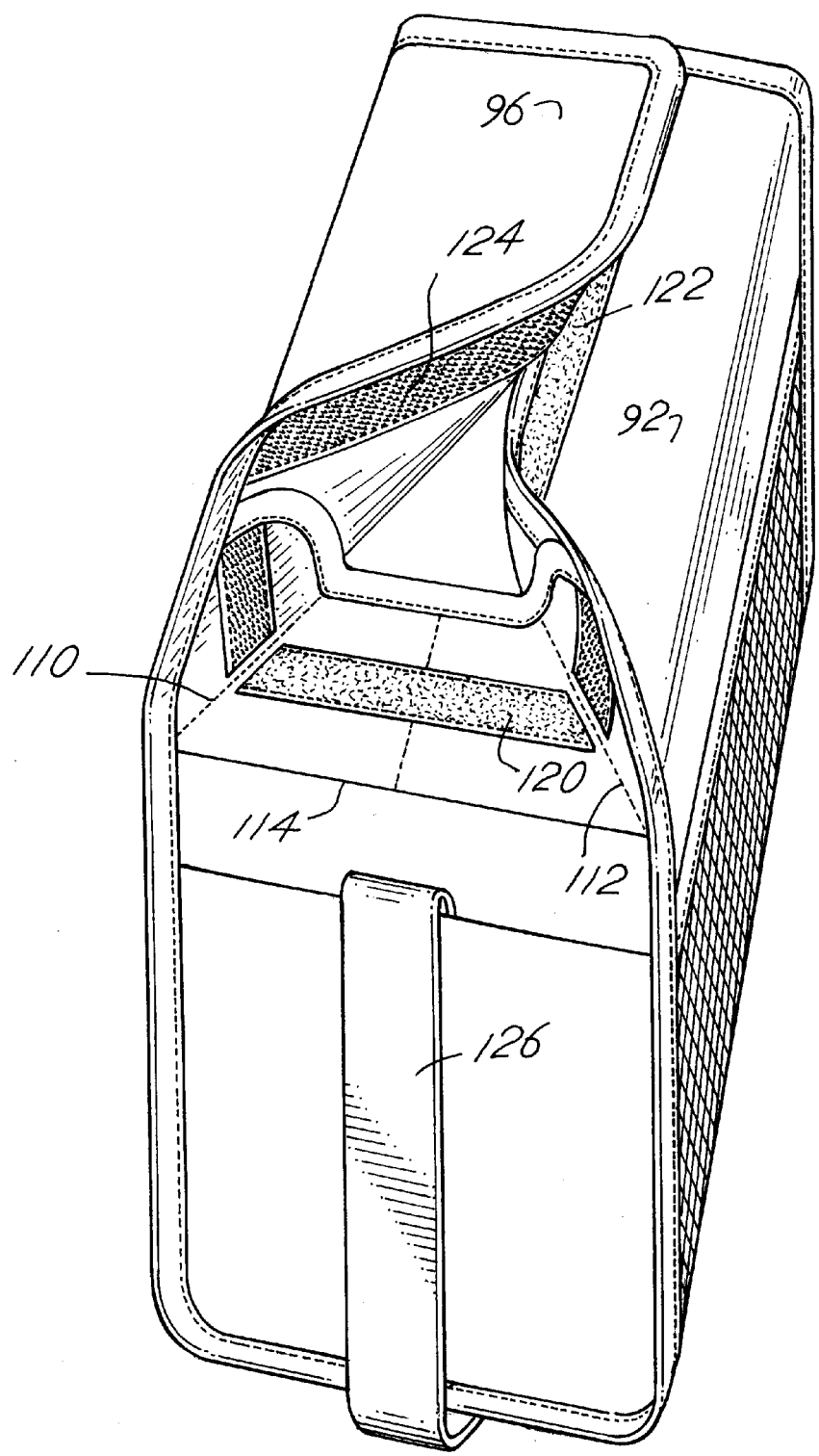
FIG. 4 is an isometric view of the bag of FIG. 3 wherein the top flaps forming the top of the bag are in a partially closed position.

FIGS. 2 through 4 illustrate an alternative embodiment of the invention that has the function of providing an insulated storage bag wherein the panels forming the bag are made from an insulating material or encapsulated insulating material in the form of a rectangular parallelepiped, storage bag enclosure. Referring to those figures, the bag includes a back side or panel 80, a front side or panel 82, and a bottom side or panel 84. The panels 80, 82, and 84 are joined along their side edges by a first end panel 86. A congruently sized, opposite or second end panel 88 connects the opposite side edges of the front panel 82, bottom panel 84, and back panel 80, thereby forming an enclosure for storage of food items, for example, or fishing bait by way of another example. All of the panels forming the embodiment of FIGS. 2–4 are generally flexible panels made from insulating material. For example, the panels may be comprised of inner and outer layers of a plastic with a low conductivity insulating material encapsulated between the plastic layers. Other materials may be utilized to provide the same functionality. Preferably all of the panels are somewhat flexible so that the entire storage bag may be folded and compressed for packaging and storage and transport from a manufacturing facility to a retail outlet.

The front panel 82 extends along a flexible margin 90 to define a first top flap or top panel 92. In a similar manner, the back panel 80 extends along a margin 94 to define a second top flap 96. The flaps 92 and 96 are sized so that upon closure they will overlap one with the other in the manner depicted in FIG. 2.

With the embodiment of FIGS. 2–4, the first top panel 92 and the second top panel 96 are connected along their respective edges 98 and 100 at one end by a first web 102. A second web 104 connects the side edges 106 of top flap panel 92 with side edge 108 of top flap panel 96. Web panels 102 and 104 have a unique configuration which enables them to be folded over into a flap configuration as illustrated in FIGS. 2 and 4 when the top panels 92 and 96 are folded one over the other. Thus the webs 102 and 104 are as depicted in FIGS. 3 and 4 have a configuration with the fold lines 110 and 112 that enable the web 102 to extend from the margin or edge 114 over the contents of the bag when the flaps 92 and 96 are in the closed position. Thus the fold line 110 of the web 102 extends from the junction of the side panel 86, back panel 80, and the second flap 96 upwardly and inwardly. In a similar fashion a fold line 112 extends from the junction of side panel 86, front panel 82, and the first or top flap 92 upwardly and inwardly so that the fold lines 110 and 112 are converging one toward the other. In this manner the web panel 102 protects the contents of the enclosed container particularly when the flaps or panels 92 and 94 are in the closed position. In a similar fashion the web or side panel web 104 includes fold lines having the function and mirror image construction of the panel 102. The panels 102 and 104 are thus mirror images of one another.

As depicted in FIG. 4, hook and eye fasteners (Velcro) are provided in the form of a strip 120 that holds the flaps 92, 96 closed at each end of the bag. Hook and eye strips 122, 124 are provided along the edges of flaps 92, 96 to hold flaps 92, 96 in closed relation. Strip 120 is provided on the outside face of web 102 in order to avoid contacting contents of the bag.

The storage bag of FIGS. 2–4 further includes carry strap 126 which connects to the respective side panels 86 and 88 so that the bag may be carried. Though not shown, handles may be included with the storage bag of FIGS. 2–4 similar to the handles 66 and 64 of the embodiment of FIG. 1. Also a front mesh storage pocket 130 may be provided.

The construction of the bag may be varied without departing from the spirit and scope of the invention. Important features include the top fold over flaps 92, 96 which are oversized so that they overlap one another. In the embodiment of FIG. 1, the construction of the elastic side panels is particularly important. In the construction of FIGS. 2–4 the use and design of the end webs 102 and 104 is particularly important. However, various alterations may be made to the storage bag as disclosed without departing from the spirit and scope of the invention. The invention is therefore to be limited only by the following claims and equivalents thereof.

What is claimed is:

1. A bag for carrying multiple, equal sized, modular, parallelepiped tackle boxes comprising, in combination:

a rectangular parallelepiped bag enclosure having a back side, a bottom side and a front side joined to form a continuous, flexible U-shaped cross-section enclosure, said back side and front side further including, respectively, a folding back top side flap and front top side flap, each top side flap for covering, at least in part, the top side, said top side flaps sized to fold over each other to enclose the interior of the bag; and said bag further including a first lateral side panel and a second lateral side panel, each lateral side panel joining the back side, front side and bottom side, each lateral side panel comprising a flexible mesh panel with an elastic band between the junction of the back side, lateral side panel and back side top flap and the junction of the front side, lateral side panel and front side top flap.

2. The bag of claim 1 further including a flexible mesh panel extending parallel to the front side and back side and between the first and second lateral side panels.

3. The bag of claim 1 or 2 in combination with multiple, modular, equal sized tackle boxes positioned in the interior of the bag.

4. The bag of claim 1 further including handles for the bag, one handle comprising a first strap connected to a junction of the back top side flap to the back side and the other handle comprising a second strap connected to a junction of the front top side flap to the front side.

5. An expandable storage case comprising, in combination:

a parallelpiped case with an open top, a flat planar rigid bottom panel, a first flat planar side panel attached to the bottom panel by a flexible hinge section, a second flat planar side panel parallel to and spaced from the first side panel and attached to the bottom panel by a flexible hinge section; a first end panel formed from a mesh and including an elastic link connecting the side panels; a second end panel formed from a mesh and including an elastic link connecting the side panels whereby the side panels are elastically biased toward each other about their respective flexible hinges; and further including first and second top closure flaps attached respectively to the first and second side panels by a flexible hinge, said first and second top closure flaps foldable over the open top and overlapping one another when folded over the full range of separation of the first and second side panels.

6. The bag of claim 5 further including a web member connecting the end panels and extending midway between the side panels to define first and second compartments within the case.

7. The case of claim 5 further including first and second handles attached respectively to the case at the hinge for the first and second flaps.

8. The case of claim 5 further including a third end panel overlying the first end panel to form a storage pocket open at the top and including an elastic band connecting the first and second side panels.

* * * * *